(12) United States Patent
Fukuda et al.

(10) Patent No.: US 10,082,861 B2
(45) Date of Patent: Sep. 25, 2018

(54) POWER SUPPLY VOLTAGE CONTROL CIRCUIT DEVICE AND POWER SUPPLY VOLTAGE CONTROL METHOD

(71) Applicant: Socionext Inc., Yokohama-shi, Kanagawa (JP)

(72) Inventors: Hiroshi Fukuda, Mizunami (JP); Hiroshi Naritomi, Kasugai (JP)

(73) Assignee: SOCIONEXT INC., Yokohama (JP)

( * ) Notice: Subject to any disclaimer, the term of this patent is extended or adjusted under 35 U.S.C. 154(b) by 36 days.

(21) Appl. No.: 15/136,317

(22) Filed: Apr. 22, 2016

(65) Prior Publication Data
US 2017/0060462 A1    Mar. 2, 2017

(30) Foreign Application Priority Data

Aug. 31, 2015  (JP) ................. 2015-170484

(51) Int. Cl.
    *G06F 1/00*    (2006.01)
    *G06F 1/32*    (2006.01)
    *G06F 1/16*    (2006.01)
    *G06F 1/20*    (2006.01)
    *H04N 5/232*   (2006.01)

(52) U.S. Cl.
    CPC .......... *G06F 1/3296* (2013.01); *G06F 1/1686* (2013.01); *G06F 1/206* (2013.01); *G06F 1/3215* (2013.01); *H04N 5/23241* (2013.01); *Y02D 10/16* (2018.01); *Y02D 10/172* (2018.01)

(58) Field of Classification Search
    CPC .... G06F 3/0625; G06F 3/0653; G06F 3/0679; G06F 1/3296

USPC .......................................................... 713/320
See application file for complete search history.

(56) References Cited

U.S. PATENT DOCUMENTS

| 8,063,509 B2 | 11/2011 | Okano | |
|---|---|---|---|
| 2009/0002508 A1* | 1/2009 | Johnson | H04N 5/374 348/222.1 |
| 2015/0253703 A1* | 9/2015 | Takane | G03G 15/2039 399/70 |

FOREIGN PATENT DOCUMENTS

| JP | 2000-214221 A | 8/2000 |
|---|---|---|
| JP | 2011-227937 A | 11/2011 |

* cited by examiner

*Primary Examiner* — Austin Hicks
(74) *Attorney, Agent, or Firm* — Arent Fox LLP (57) ABSTRACT

A power supply voltage control circuit device includes a power supply control circuit, a memory, and an arithmetic processing circuit. The power supply control circuit is configured to control a power supply voltage to be applied to a target circuit, and the memory is configured to store a first processing result when the target circuit is operated by setting the power supply voltage to a first voltage and a second processing result when the target circuit is operated by setting the power supply voltage to a second voltage different from the first voltage. The arithmetic processing circuit is configured to perform verify by reading the first processing result and the second processing result from the memory and output a result of the verify to the power supply control circuit, and wherein the power supply control circuit controls the power supply voltage based on the result of the verify.

12 Claims, 10 Drawing Sheets

POWER SUPPLY VOLTAGE CONTROL CIRCUIT DEVICE AND POWER SUPPLY VOLTAGE CONTROL METHOD

CROSS-REFERENCE TO RELATED APPLICATION

This application is based upon and claims the benefit of priority of the prior Japanese Patent Application No. 2015-170484, filed on Aug. 31, 2015, the entire contents of which are incorporated herein by reference.

FIELD

The embodiments discussed herein are related to a power supply voltage control circuit device and a power supply voltage control method.

BACKGROUND

In recent years, for example, semiconductor integrated circuits (large scale integration (LSI), target circuits, chips) have utilized a technique called Adaptive Supply Voltage (ASV) to reduce power consumption.

The ASV technique is to reduce power consumption by, for example, controlling a power supply voltage to be lowered regarding chips of which processes vary on Fast side (a current flowing side) according to the variation.

As a method for obtaining an effect of the ASV more actively, an ASV technique according to temperature has been suggested. The ASV technique according to temperature is to realize further reduction of power consumption by, for example, installing a temperature sensor within an LSI and controlling a voltage based on a temperature detected by the temperature sensor.

As described above, for example, the ASV technique has been adopted to reduce power consumption of semiconductor integrated circuits. However, the above-described ASV technique only associates an operable voltage with a monitor value and a temperature of processes.

Thus, for example, a table for controlling voltage is expected to guarantee operation with respect to any LSIs, and it becomes difficult to control the individual LSIs at an optimum voltage.

In other words, the above-described ASV technique is not for controlling each individual LSI to the respective optimum voltage, and it may be thought that there is a room for further improvement in reduction of power consumption. Further, in order to adopt the above-described ASV technique, for example, components such as a temperature sensor will be installed, and thus there are issues in cost, occupancy area, and usability.

Conventionally, various suggestions have been made to reduce power consumption of semiconductor integrated circuits by adopting the ASV technique.

Patent Document 1: Japanese Laid-open Patent Publication No. 2011-227937
Patent Document 2: Japanese Laid-open Patent Publication No. 2000-214221

SUMMARY

According to an aspect of the embodiments, there is provided a power supply voltage control circuit device includes a power supply control circuit, a memory, and an arithmetic processing circuit.

The power supply control circuit is configured to control a power supply voltage to be applied to a target circuit, and the memory is configured to store a first processing result when the target circuit is operated by setting the power supply voltage to a first voltage and a second processing result when the target circuit is operated by setting the power supply voltage to a second voltage different from the first voltage.

The arithmetic processing circuit is configured to perform verify by reading the first processing result and the second processing result from the memory and output a result of the verify to the power supply control circuit, and wherein the power supply control circuit controls the power supply voltage based on the result of the verify.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
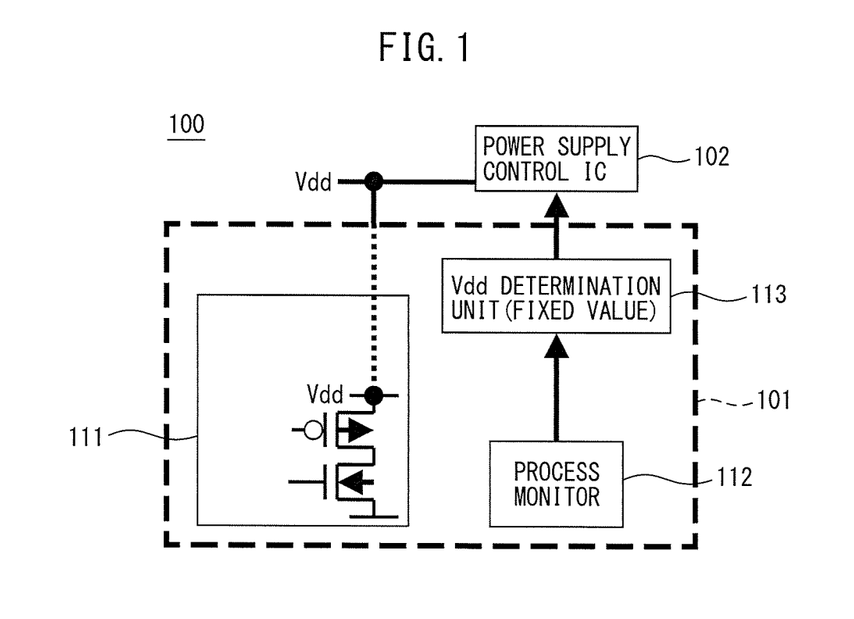
FIG. 1 is a block diagram schematically illustrating an example of a power supply voltage control circuit device to which the ASV technique is applied by a process monitor.

First, before describing embodiments of a power supply voltage control circuit device and a power supply voltage control method according to the present invention, an example of a power supply voltage control circuit device and issues of the power supply voltage control circuit device are described first with reference to FIG. 1.

FIG. 1 is a block diagram schematically illustrating an example of a power supply voltage control circuit device to which the ASV technique is applied by a process monitor. As illustrated in FIG. 1, a power supply voltage control circuit device 100 includes, for example, a semiconductor integrated circuit (target circuit) 101 and a power supply control integrated circuit (IC) (power supply control circuit, Power Management Integrated Circuit (PMIC)) 102.

The semiconductor integrated circuit (chip) 101 includes an application processing circuit (internal circuit) 111 for realizing various functions, a process monitor (monitor circuit) 112 for monitoring process variation, and a Vdd determination unit 113 for determining a power supply voltage (Vdd).

The process monitor 112 measures the process variation, and the Vdd determination unit 113 controls the power supply control IC 102 based on an output from the process monitor 112 to optimize the power supply voltage Vdd of each individual chip 101.

In other words, the Vdd determination unit 113 is to reduce power consumption by controlling the power supply voltage Vdd to be lowered regarding, for example, a chip of which a process varies on Fast side (a current flowing side) according to the variation.

However, the power supply voltage control circuit device 100 illustrated in FIG. 1 controls the power supply voltage Vdd, for example, regardless of a circuit operation of the chip 101, i.e., without considering an operation of the application processing circuit 111. Further, the power supply voltage control circuit device 100 illustrated in FIG. 1 arranges the process monitor 112 in the chip 101.

Further, the ASV technique according to temperature is considered, however, in this case, for example, a temperature sensor is installed in the chip 101, and thus there are issues in cost, occupancy area, and usability.

Furthermore, the above-described ASV technique only associates an operable voltage (Vdd) with a monitor value and a temperature of the process and does not actually consider an operation of the application processing circuit (chip), and it may be thought that there is a room for further improvement in reduction of power consumption.

Figure 2:
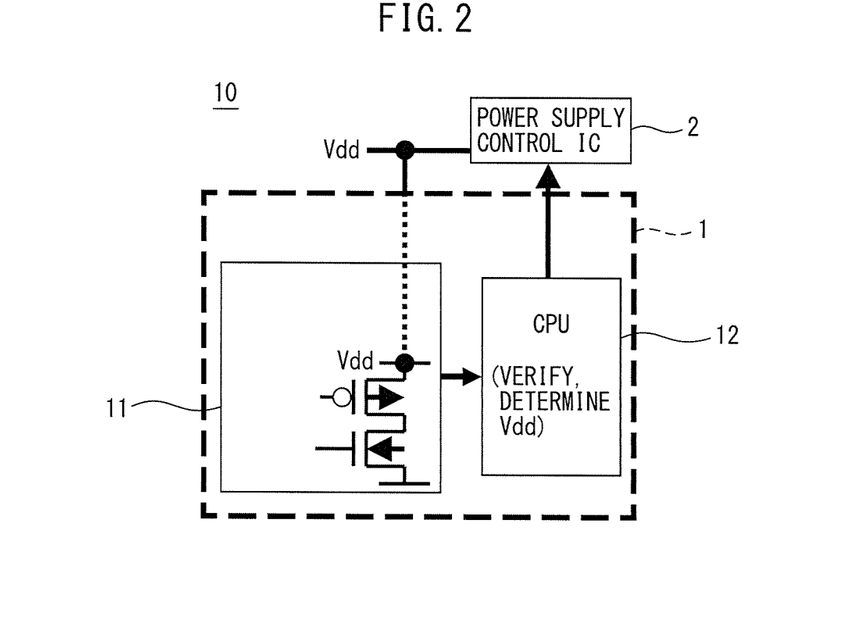
FIG. 2 is a block diagram schematically illustrating an example of a power supply voltage control circuit device according to the present embodiment.

Hereinafter, embodiments of a power supply voltage control circuit device and a power supply voltage control method will be described in detail with reference to the accompanying drawings. FIG. 2 is a block diagram schematically illustrating an example of the power supply voltage control circuit device according to the present embodiment.

As illustrated in FIG. 2, a power supply voltage control circuit device 10 of the present embodiment includes, for example, a semiconductor integrated circuit (target circuit, chip) 1 and a power supply control IC (power supply control circuit, PMIC) 2. The chip 1 includes an application processing circuit (internal circuit) 11 for realizing various functions and a central processing unit (CPU, arithmetic processing device, arithmetic processing circuit) 12 for performing verify processing and determination processing of a power supply voltage (Vdd) which are described in detail below.

The CPU 12 controls the power supply voltage Vdd of the chip 1 via the power supply control IC 2 so as to be a Vdd determined based on the verify processing. The verify processing and the Vdd determination processing by the CPU 12 may also be realized by a hardware configuration.

Figure 3A:
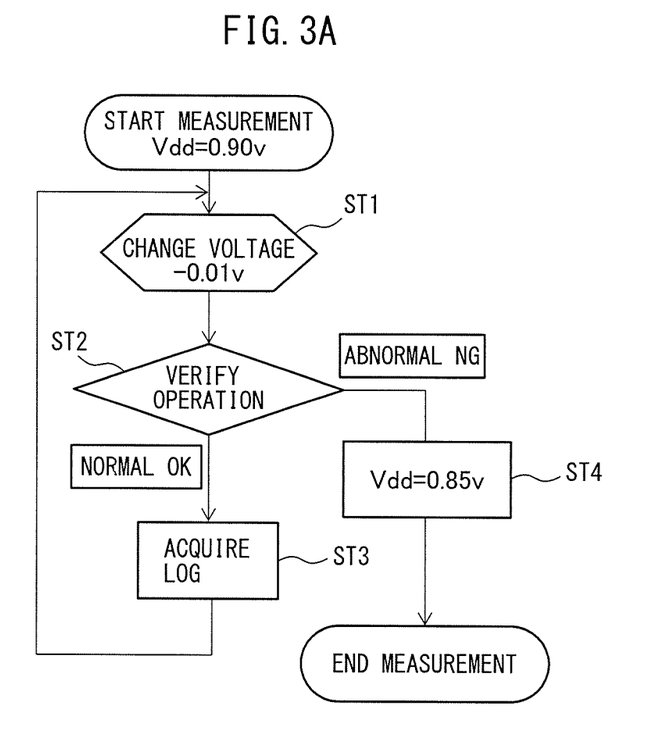
FIG. 3A and FIG. 3B are diagrams illustrating an example of log acquisition processing of a power supply voltage control method according to the present embodiment.
Figure 3B:
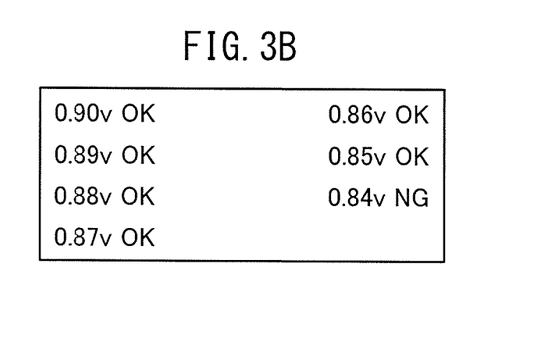

FIG. 3A and FIG. 3B are diagrams illustrating an example of log acquisition processing of the power supply voltage control method according to the present embodiment. FIG. 3A is a flowchart illustrating an example of the log acquisition processing (control processing of the power supply voltage), and FIG. 3B is a diagram illustrating an example of an acquired log.

As illustrated in FIG. 3A, when measurement of the power supply voltage Vdd is started, in step ST1, a voltage level (voltage) of the power supply voltage Vdd is changed by −0.01 V (lowered by 0.01 V). As illustrated in FIG. 3B, the power supply voltage Vdd is set to Vdd=0.90 V (a voltage at which operation may be performed without any problems: guarantee voltage for guaranteeing operation) at the start of the measurement of the power supply voltage Vdd, and then the power supply voltage Vdd is sequentially lowered by 0.01 V (a predetermined step).

Next, the processing proceeds to step ST2, the verify operation (verify) is performed, and whether normal (OK) or abnormal (NG) is determined. The verify operation corresponds to processing for, for example, comparing first image data processed at a voltage immediately before and second image data processed at a current voltage (the voltage immediately before—0.01 V) of an image processing chip and determining whether both image data pieces have no error therebetween (coincide with each other).

In step ST2, when it is determined as normal, i.e., the first image data coincides with the second image data (processing results of the image processing chip at the both voltages are the same), the processing proceeds to step ST3, and a log is acquired. Further, the processing returns to step ST1, and the similar processing is repeated until it is determined that the first image data does not coincide with the second image data.

On the other hand, in step ST2, when it is determined as abnormal, i.e. words, the first image data does not coincide with the second image data (processing results of the image processing chip (image processing circuit) at the both voltages are different), the processing proceeds to step ST4. Even when it is determined as abnormal in step ST2, the log is acquired.

Specifically, FIG. 3B illustrates the logs acquired by the verify in step ST2 in which the power supply voltage Vdd is determined, for example, as OK (normal) at Vdd=0.90 V to 0.85 V and determined as NG (abnormal) at Vdd=0.84 V.

In step ST4, a voltage (Vdd=0.85 V) immediately before a voltage (Vdd=0.84 V) at which it is determined that the first image data does not coincide with the second image data (abnormal) is set as a normally operable lowest voltage, and the measurement is terminated.

In other words, for example, the power supply voltage Vdd output from the power supply control IC 2 to the semiconductor integrated circuit (target circuit) 1 in the above-described FIG. 2 is controlled to be 0.85 V as the normally operable lowest voltage.

Figure 10:
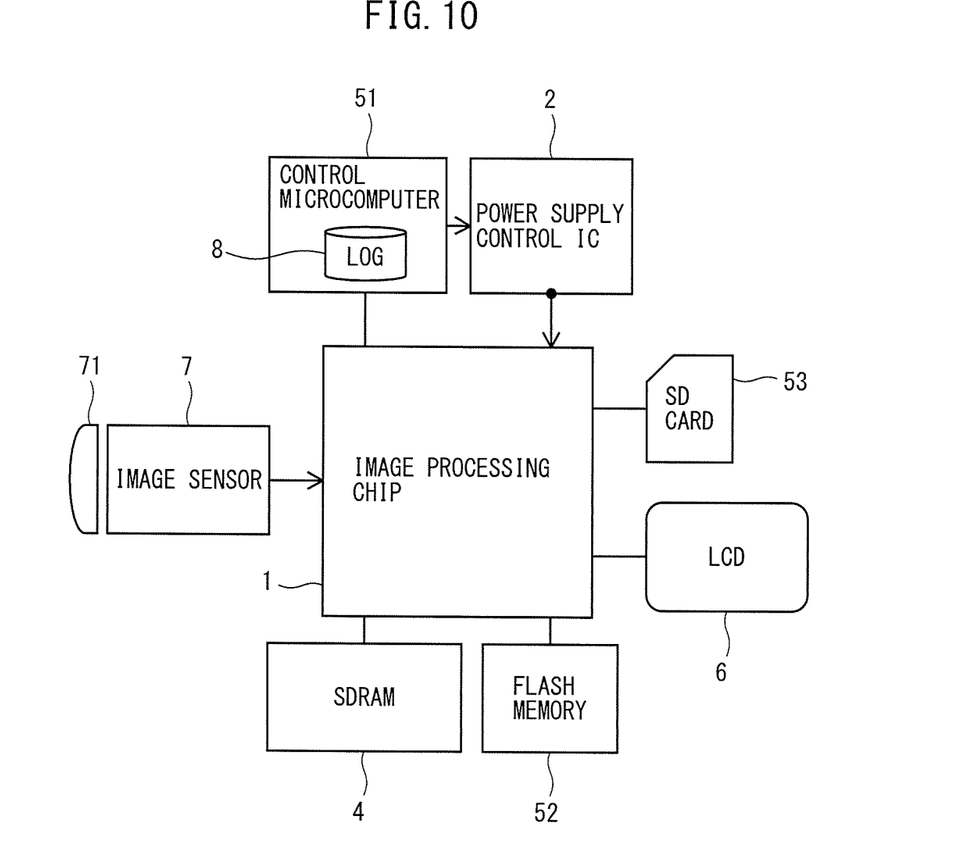
FIG. 10 is a block diagram illustrating a power supply voltage control circuit device according to a first embodiment.

The log (8) as illustrated in FIG. 3B acquired by the verify processing in step ST2 is stored in, for example, a memory of a high-order control microcomputer (arithmetic processing device, arithmetic processing circuit 51) as illustrated in FIG. 10 described below, and the above-described power supply voltage control processing is performed.

Figure 11:
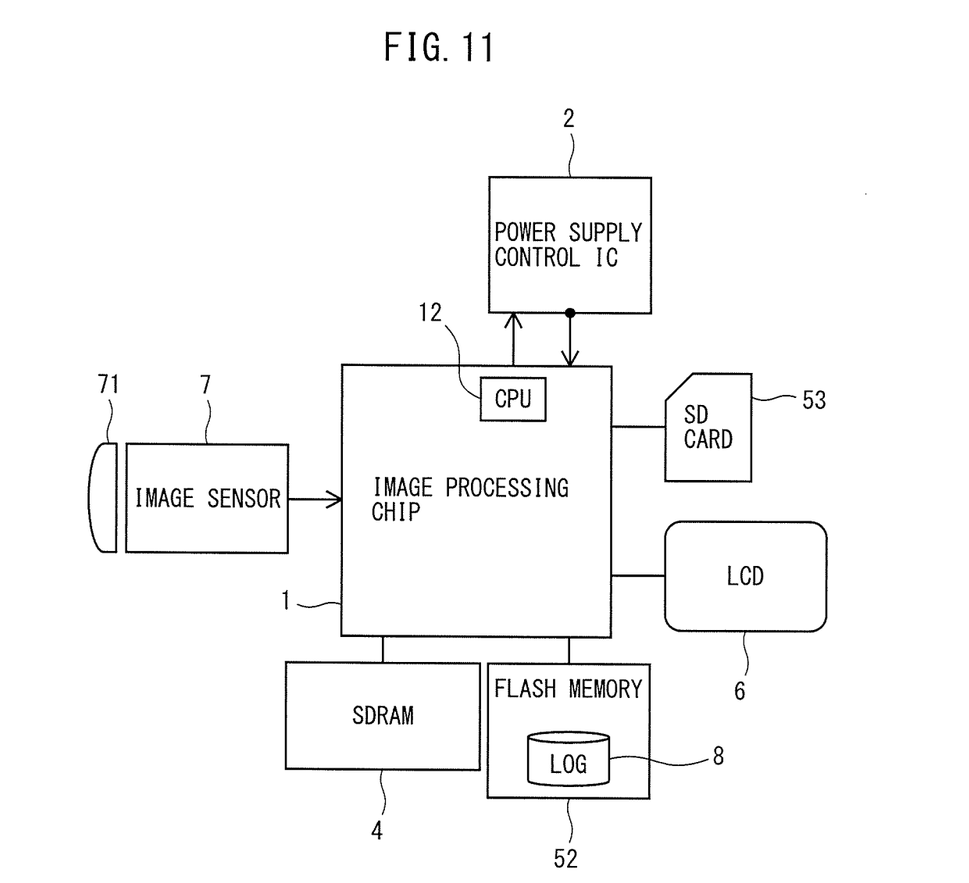
FIG. 11 is a block diagram illustrating a power supply voltage control circuit device according to a second embodiment.

Alternatively, the acquired log (8) may be stored in, for example, a nonvolatile memory such as a flash memory (52) provided outside the chip as illustrated in FIG. 11 described below, and the CPU 12 in the chip (image processing circuit) 1 may perform the above-described power supply voltage control processing. Further, the power supply voltage control processing may be provided as a program executed by the arithmetic processing device (arithmetic processing circuit, CPU 12, control microcomputer 51, and the like).

A plurality of logs (8) acquired in a predetermined time period is accumulated in a memory (nonvolatile memory), and a level of the power supply voltage is controlled using the accumulated logs, so that the power supply voltage control may be stably performed by eliminating factors such as noise and short-term fluctuation.

The above-described power supply voltage control method may be performed by, for example, a manufacturer manufacturing digital cameras using image processing chips of the digital cameras. For example, as described with reference to FIG. 6 to FIG. 9, when an image processing chip (target circuit) has a plurality of operation modes, an optimum power supply voltage (the normally operable lowest voltage) may be set to each of the plurality of operation modes.

Alternatively, the above-described power supply voltage control method may be performed, for example, during when an end user who purchased a digital camera is actually using the digital camera. In other words, for example, depending on whether the environment in which the end user actually uses the digital camera is a cold district or a warm district, an optimum power supply voltage controlled by applying the present embodiment is set to the normally operable lowest voltage suitable for each environment.

In this case, the end user may expect an effect that, for example, power consumption of the digital camera may be reduced (service life of the battery may be extended) after a certain period of time in which the camera is controlled to the power supply voltage suitable for the usage environment than when the camera was first purchased.

As described above, the present embodiment may realize the ASV of the power supply voltage suitable for each individual semiconductor integrated circuit (image processing chip, target circuit) without adding a special component or significantly increasing circuits.

Further, the optimum ASV may be provided which is suitable for not only a semiconductor integrated circuit (LSI) but also each individual system (a set including an LSI and an external element: for example, a digital camera as a product), or a usage method of the system.

Figure 4:
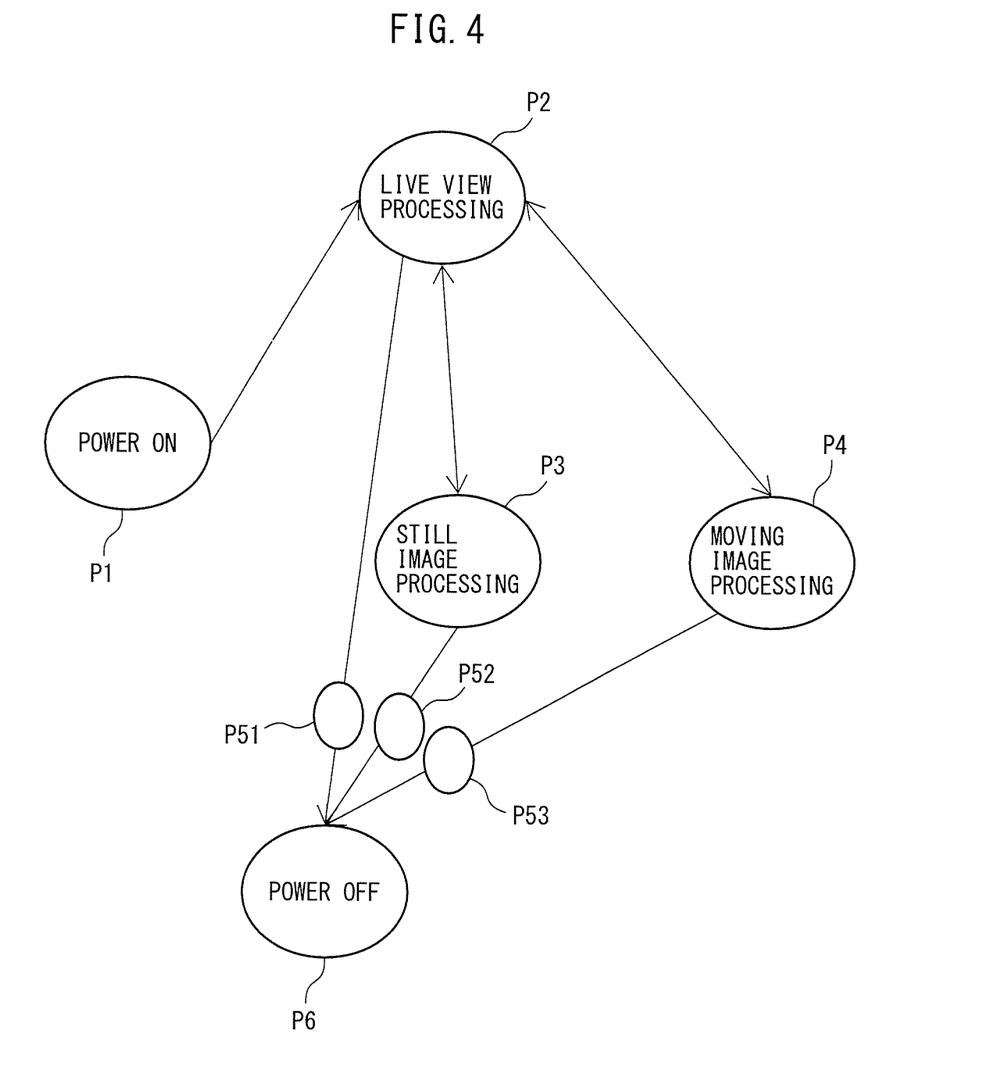
FIG. 4 is a diagram illustrating an example to which the log acquisition processing illustrated in FIG. 3A is applied.

FIG. 4 is a diagram illustrating an example to which the log acquisition processing illustrated in FIG. 3A is applied. In the following description, an image processing chip (image processing circuit) in a digital camera system is described as an example, however, application of the present embodiment is not limited to the image processing chip (image processing system).

As illustrated in FIG. 4, for example, in an image processing system, after power is supplied (power ON) P1, live view processing P2 for displaying an image on a liquid crystal display (LCD: a monitor 6) and still image processing P3 for generating a still image (a Joint Photographic Experts Group (JPEG) image) are performed.

Further, moving image processing P4 for generating a moving image (Moving Picture Experts Group (MPEG)-2, H.264/MPEG-4 AVC, H.265 (High Efficiency Video Coding (HEVC)) and the like) is also performed.

During when the live view processing P2, the still image processing P3, and the moving image processing P4 are performed, i.e., from the power ON (P1) to when the power is shut down (power OFF) P6, log acquisition processing P51, P52, and P53 described with reference to FIG. 3A are performed.

Generally, for example, when a verify operation is performed by the arithmetic processing circuit (CPU 12) embedded in the chip (image processing chip 1), log acquisition becomes difficult when the chip including the CPU causes runaway. Thus, it is desirable that log acquisition is performed by a hardware configuration which is not affected by variation in power supply voltage.

In other words, for example, in the configuration illustrated in FIG. 2, the log is acquired by the power supply control IC 2, and the CPU 12 reads a verify result after a certain period of time from when the power supply control IC 2 receives a power off signal and accumulates the verify result. As a target to be read by the CPU 12, a register may be applied which has an initial value NG (abnormal) and is rewritten when verify is OK (normal). Accordingly, for example, when the power supply voltage Vdd is a low voltage and the chip 1 causes runaway, it is determined NG as a log, and then the power may be turned off as it is.

Alternatively, for example, only a timer and a reading block of a log may be prepared, and the reading block is designed to have a sufficient margin for setting up and holding. Accordingly, the reading block may guarantee an operation at a lower voltage than another block.

Alternatively, for example, if there is an always on domain as a real time clock (RTC: a chip dedicated to a clock) on a mother board, such an always on domain may be used. In other words, in addition to preparing a verify scenario to the always on domain, processed contents from power-on to power-off are stored therein, and the stored data may be collected when the power is turned off.

As described above, for example, a result of the verify operation by the arithmetic processing circuit may be accumulated as a log in the memory by applying various methods.

Figure 5:
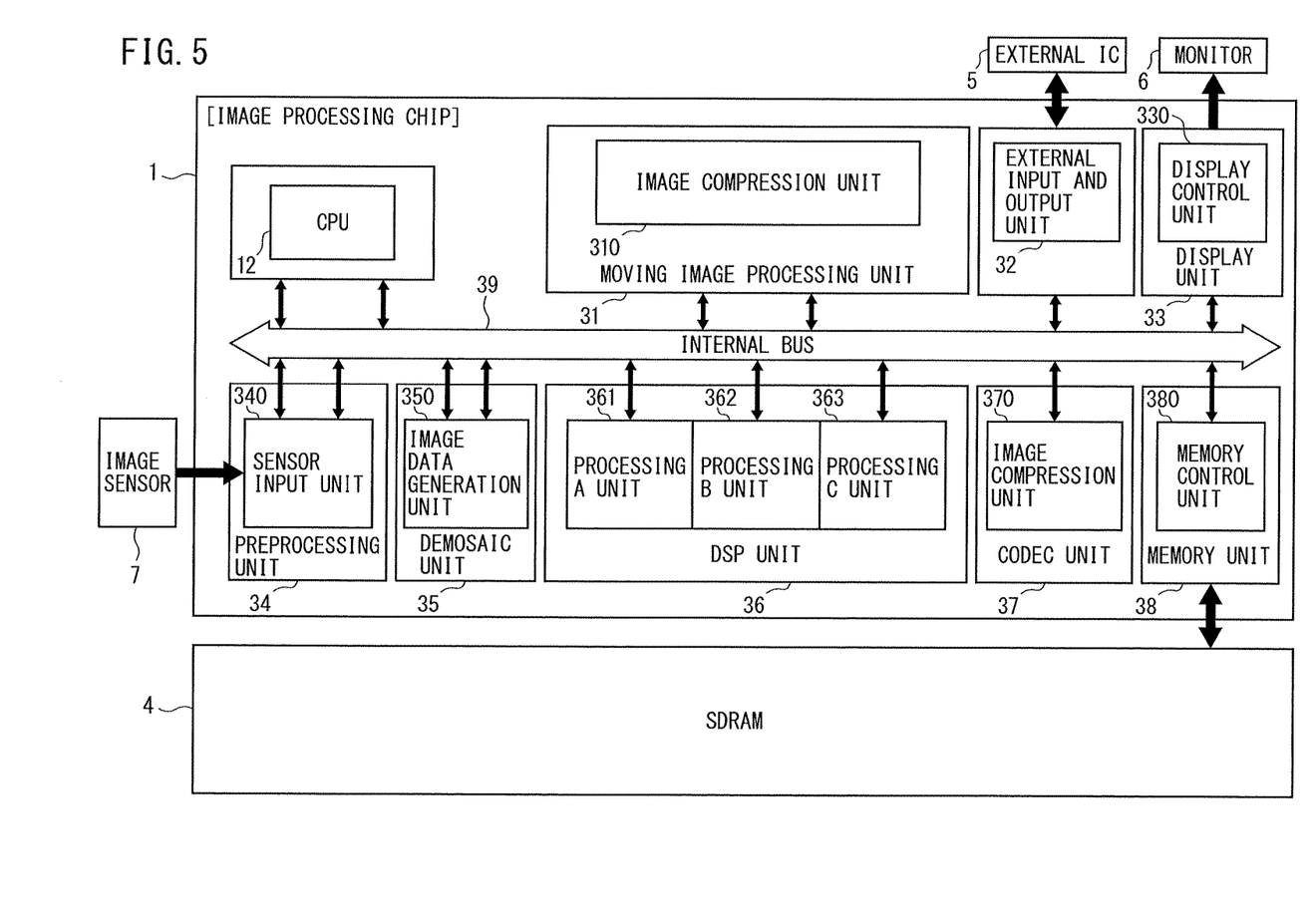
FIG. 5 is a block diagram illustrating an image processing chip as an example of a semiconductor integrated circuit to which the present embodiment is applied.

FIG. 5 is a block diagram illustrating an image processing chip (image processing circuit, semiconductor integrated circuit) as an example of the semiconductor integrated circuit according to the present embodiment, and FIG. 6 to FIG. 9 are diagrams illustrating cases when the image processing chip illustrated in FIG. 5 performs each image processing.

Figure 6:
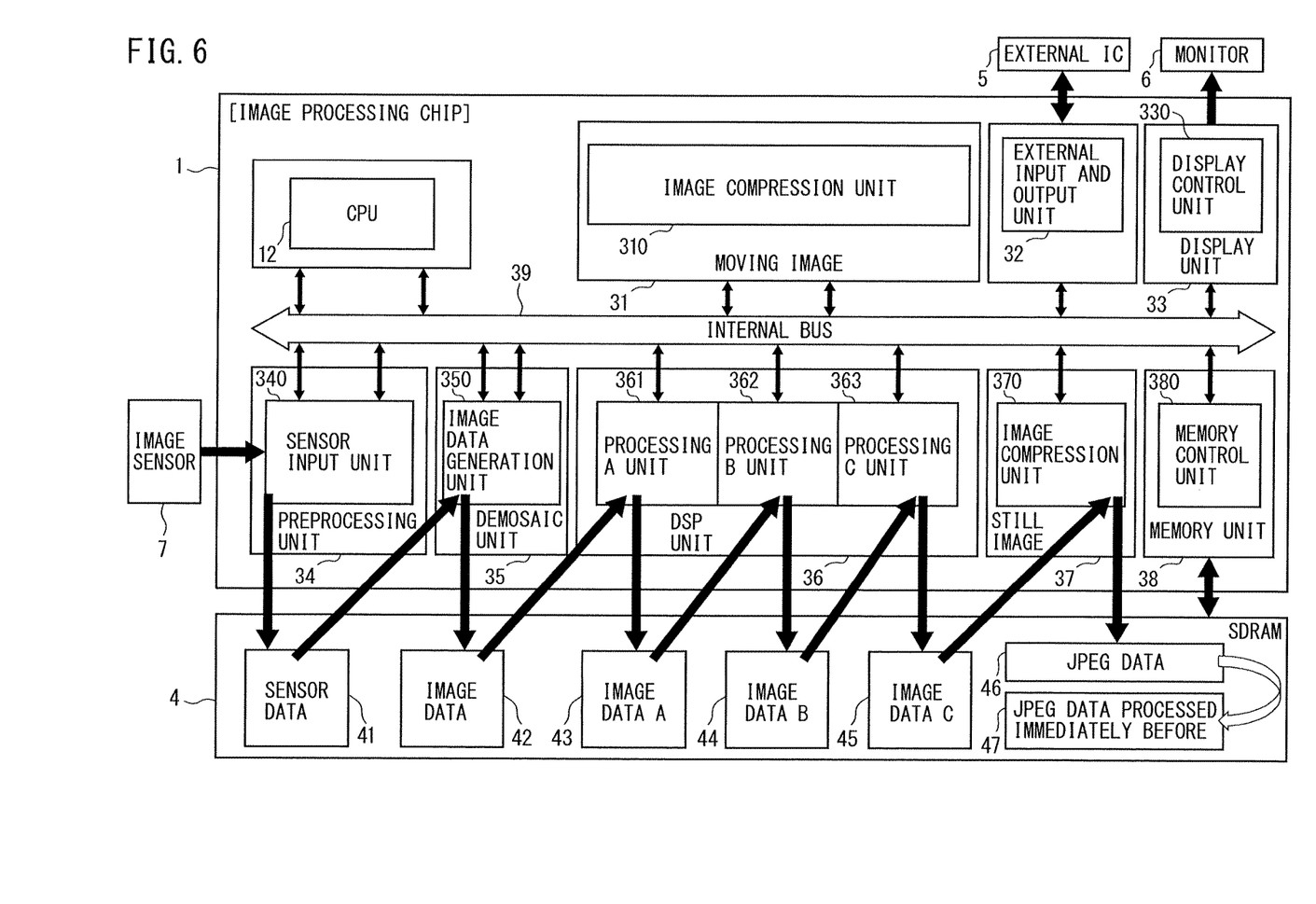
FIG. 6 is a diagram illustrating a case when still image processing is performed by the image processing chip illustrated in FIG. 5.
Figure 7:
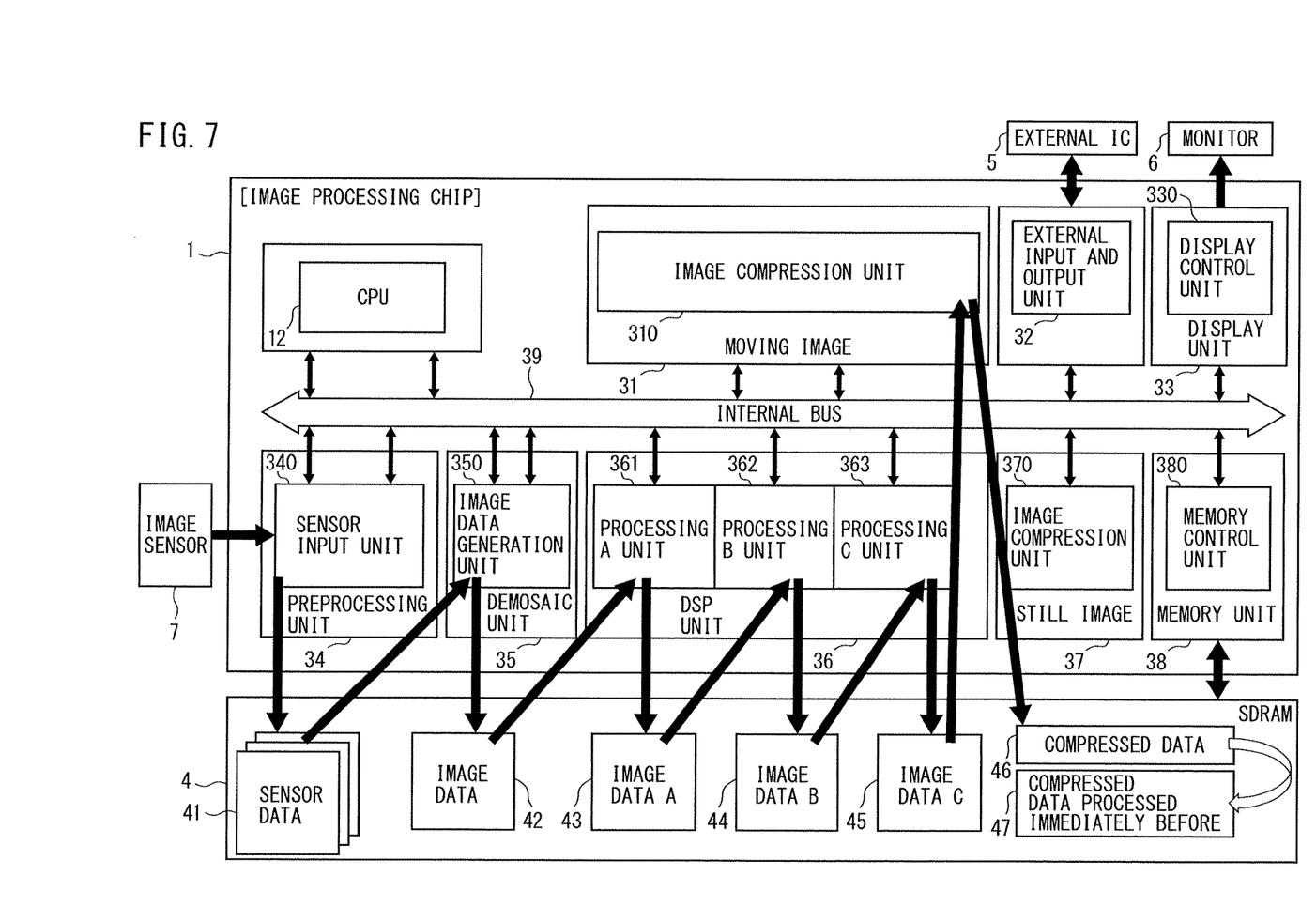
FIG. 7 is a diagram illustrating a case when an example of moving image processing is performed by the image processing chip illustrated in FIG. 5.
Figure 8:
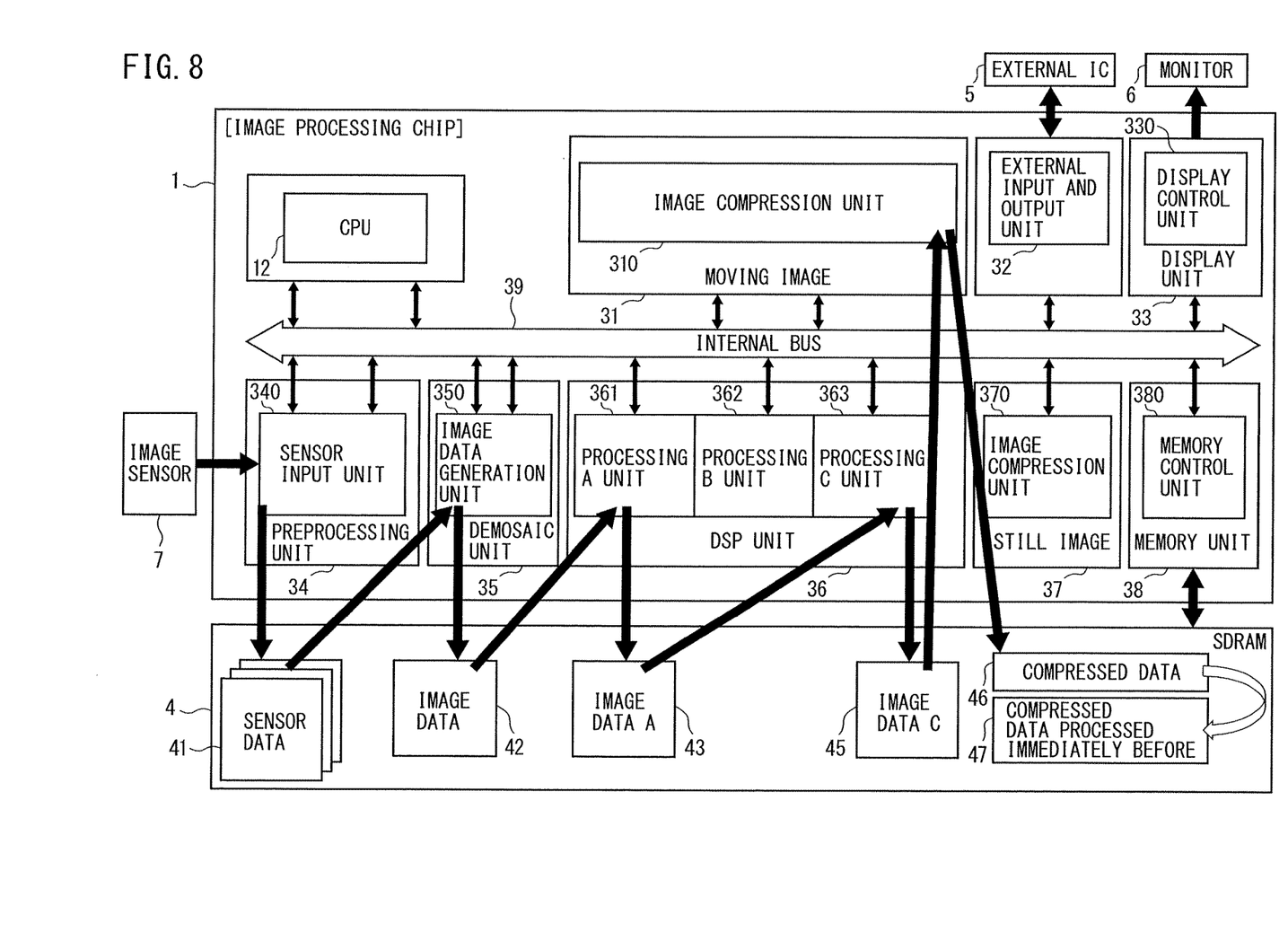
FIG. 8 is a diagram illustrating a case when another example of moving image processing is performed by the image processing chip illustrated in FIG. 5.
Figure 9:
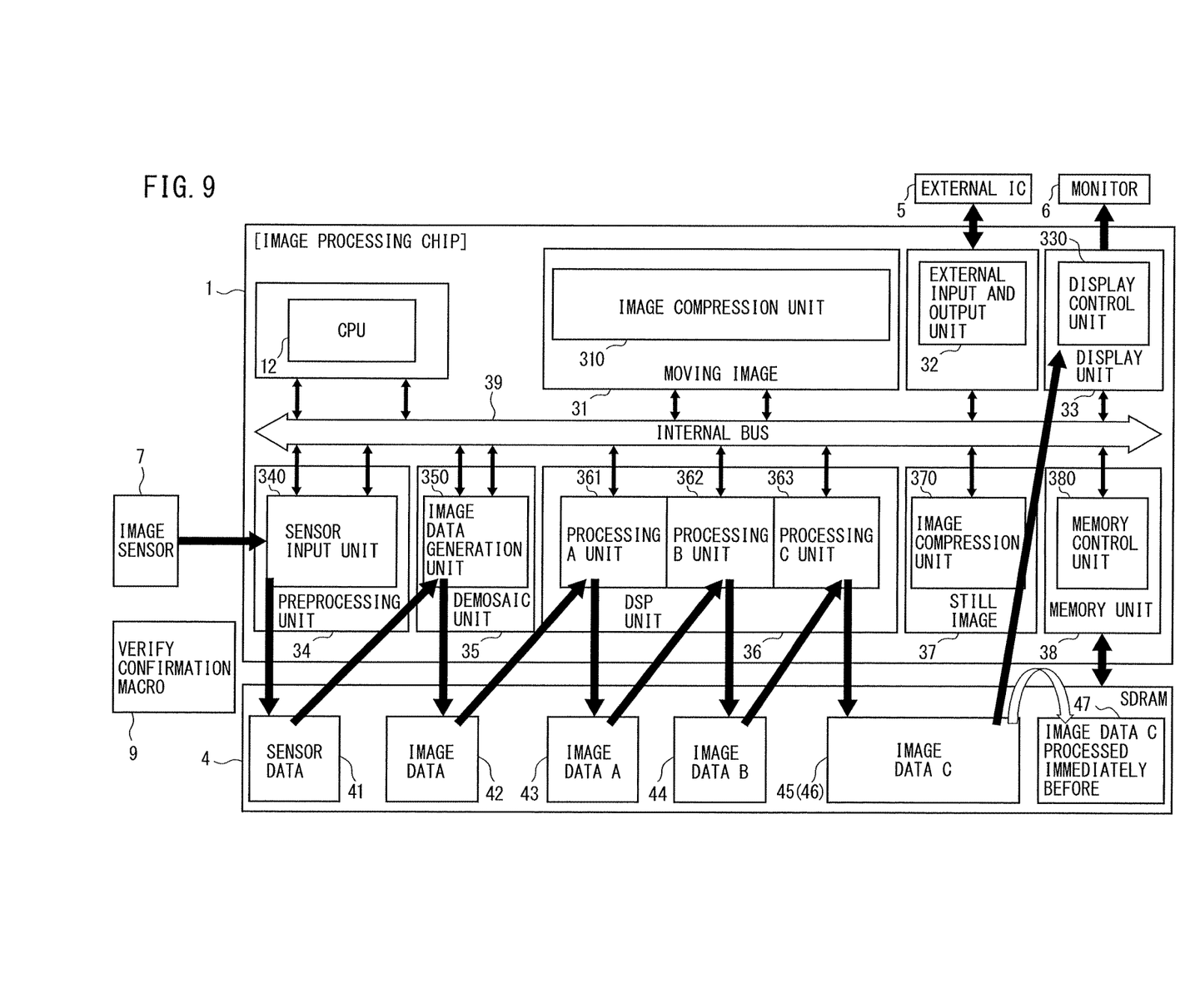
FIG. 9 is a diagram illustrating a case when live view processing is performed by the image processing chip illustrated in FIG. 5.

In other words, FIG. 6 illustrates a case when still image processing is performed, FIG. 7 and FIG. 8 illustrate cases when an example and another example of moving image processing are performed, and FIG. 9 illustrates a case when live view processing is performed.

As illustrated in FIG. 5, the image processing chip 1 includes the CPU 12, a moving image processing unit 31, an external input and output unit 32, a display unit 33, a preprocessing unit 34, a demosaic unit 35, a Digital Signal Processor (DSP) unit 36, a codec unit 37, a memory unit 38, and an internal bus 39.

The moving image processing unit 31 includes an image compression unit 310 for compressing a moving image, the display unit 33 includes a display control unit 330 for controlling an image to be displayed on the external monitor (LCD) 6, and the preprocessing unit 34 includes a sensor input unit 340 for acquiring data from an image sensor (sensor) 7.

The demosaic unit 35 includes an image data generation unit 350 for generating image data by performing demosaic processing, and the DSP unit 36 includes a processing A unit 361 for performing processing A, a processing B unit 362 for performing processing B, and a processing C unit 363 for performing processing C.

The codec unit 37 includes an image compression unit 370 for compressing an image, and the memory unit 38 includes a memory control unit 380 for controlling an external Synchronous Dynamic Random Access Memory (SDRAM).

The CPU 12, the moving image processing unit 31, the external input and output unit 32, the display unit 33, the preprocessing unit 34, the demosaic unit 35, the DSP unit 36, the codec unit 37, and the memory unit 38 are mutually connected via the internal bus 39.

As illustrated in FIG. 5 and FIG. 6, the image processing chip 1 performs processing based on data acquired from the image sensor (sensor) 7 and outputs data by ultimately converting into a visible form for a user such as a JPEG image. The data ultimately converted and output may be, for example, a moving image (compressed data) as illustrated in FIG. 7 and FIG. 8 in addition to a JPEG image (a still image).

As illustrated in FIG. 6, when the image processing chip 1 illustrated in FIG. 5 performs the still image processing, for example, the image compression unit 310 (the moving image processing unit 31) and the display control unit 330 (the display unit 33) are brought into a stop state by, for example, a gating circuit to reduce the power consumption.

When the still image processing is performed, sensor data 41 from the image sensor 7 is stored in an SDRAM 4 via the sensor input unit 340. The image data generation unit 350 reads the sensor data 41 from the SDRAM 4, performs processing thereon, and stores generated image data 42 in the SDRAM 4.

In the DSP unit 36, the processing A unit 361 reads the image data 42, performs the processing A thereon, and stores generated image data A 43 in the SDRAM 4. The processing B unit 362 reads the image data A 43, performs the processing B thereon, and stores generated image data B 44 in the SDRAM 4. Further, the processing C unit 363 reads the image data B 44, performs the processing C thereon, and stores generated image data C 45 in the SDRAM 4.

The image compression unit 370 (the codec unit 37) reads the image data C 45 from the SDRAM 4, performs image compression processing thereon, and stores generated image data (JPEG data) 46 in the SDRAM 4. In FIG. 6, the reference numeral 47 indicates JPEG data generated by the image compression unit 370 performing the image compression processing immediately before generating the JPEG data 46.

If the log acquisition processing in FIG. 3A is applied, for example, when the JPEG data 47 (first image data) is data at the power supply voltage Vdd=0.85 V, the JPEG data (second image data) 46 is data at Vdd=0.84 V.

When the current power supply voltage is Vdd=0.85 V, in the verify operation in step ST2 of FIG. 3A, the first image data coincides with the second image data, and it is determined as OK (normal) as illustrated in FIG. 3B. Thus, in step ST1, the power supply voltage Vdd is set to be lower by one step (0.01 V), and the verify operation in step ST2 is performed again.

At that time, the JPEG data 47 (the first image data) is data at Vdd=0.84 V, and the JPEG data (the second image data) 46 is data at Vdd=0.85 V.

When the current power supply voltage is Vdd=0.84 V, the first image data does not coincide with the second image data, and it is determined as NG (abnormal) as illustrated in FIG. 3B. Thus, in step ST2, for example, the voltage (Vdd=0.85 V) immediately before the voltage (Vdd=0.84 V) determined as NG because the first image data does not coincide with the second image data is acquired as the normally operable lowest voltage.

In the above descriptions, for example, a series of processing from the image sensor 7→the SDRAM 4→the image processing chip 1→the SDRAM 4 (a JPEG image) described with reference to FIG. 6 may be executed as a program (a verify program) of the CPU 12 in the image processing chip 1. Alternatively, the processing may be executed as a verify program of the control microcomputer (for example, the control microcomputer 51 in FIG. 10 described below) and the like provided outside the image processing chip 1.

As illustrated in FIG. 7, when the image processing chip 1 illustrated in FIG. 5 performs an example of the moving image processing, for example, the image compression unit 370 (the codec unit 37) is brought into the stop state to reduce the power consumption.

Further, when the example of the moving image processing is performed, the sensor data 41 sequentially output from the image sensor 7 are stored in the SDRAM 4 via the sensor input unit 340. The image data generation unit 350 reads the sensor data 41 from the SDRAM 4, performs processing thereon, and stores the generated image data 42 in the SDRAM 4.

Processing (pipeline processing) by the DSP unit 36 is similar to the still image processing described with reference to FIG. 6, and the processing A unit 361 reads the image data 42, performs the processing A thereon, and stores the generated image data A 43 in the SDRAM 4.

The processing B unit 362 reads the image data A 43, performs the processing B thereon, and stores the generated image data B 44 in the SDRAM 4. Further, the processing C unit 363 reads the image data B 44, performs the processing C thereon, and stores the generated image data C 45 in the SDRAM 4.

In the example of the moving image processing illustrated in FIG. 7, the image compression unit 310 (the moving image processing unit 31) for the moving image which is in the stop state in the still image processing illustrated in FIG. 6 is operated, and the image compression unit 370 (the codec unit 37) for the still image is brought into the stop state.

Further, the image compression unit 310 reads the image data C 45 from the SDRAM 4, performs the image compression processing (compression processing of the moving image), and stores generated compressed data (for example, H.264/MPEG-4 AVC) 46 in the SDRAM 4. In FIG. 7, the reference numeral 47 indicates compressed data generated by the image compression unit 310 performing the image compression processing immediately before generating the compressed data 46.

The verify processing of the compressed data (the first image data) 47 generated at the power supply voltage immediately before and the compressed data (the second image data) 46 generated at the current power supply voltage are substantially similar to that of the still image processing above described in FIG. 6, thus the description thereof is omitted.

However, in the example of the moving image processing in FIG. 7, the circuit block in the stop state (the image compression unit 370) is different from the circuit blocks in the stop state (the image compression unit 310 and the display control unit 330) in the still image processing in FIG. 6, so that it may be thought that the normally operable lowest voltage to be acquired is different.

In other words, by applying the present embodiment, the normally operable lowest voltage suitable for the image processing chip 1 (semiconductor integrated circuit) actually operating may be acquired, and, for example, the ASV based on the operation mode may be performed.

The ASV based on the operation mode is similar to the other example of the moving image processing described with reference to FIG. 8 and the live view processing described with reference to FIG. 9, and the ASV suitable for an operation state actually used may be realized.

As illustrated in FIG. 8, when the image processing chip 1 illustrated in FIG. 5 performs the other example of the moving image processing, for example, not only the image compression unit 370 (the codec unit 37) but also the processing B unit 362 of the DSP unit 36 are brought into the stop state to further reduce the power consumption.

In other words, the other example of the moving image processing illustrated in FIG. 8 corresponds to a case in which generation processing of the image data B by the processing B unit 362 is omitted from the above-described example of the moving image processing illustrated in FIG. 7. Thus, the processing C unit 363 reads the image data A 43 from the SDRAM 4, performs the processing C thereon, and stores the generated image data C 45 in the SDRAM 4.

Further, the image compression unit 310 reads the image data C 45 from the SDRAM 4, performs the image compression processing thereon, and stored the generated compressed data 46 in the SDRAM 4. A relationship between the compressed data (the first image data) 47 generated at the power supply voltage immediately before and the compressed data (the second image data) 46 generated at the current power supply voltage is similar the above-described one in FIG. 7.

In the other example of the moving image processing illustrated in FIG. 8, the processing B unit 362 which is operated in the example of the moving image processing illustrated in FIG. 7 is brought into the stop state, and thus, it may be thought that the normally operable lowest voltage to be acquired is different as described above.

As illustrated in FIG. 9, when the image processing chip 1 illustrated in FIG. 5 performs the live view processing, for example, the image compression unit 310 (the moving image processing unit 31) and the image compression unit 370 (the codec unit 37) which are not necessary for the live view processing are brought into the stop state.

In the example illustrated in FIG. 9, a verify confirmation macro 9 is added, and the above described verify processing of the first image data and the second image data are performed by the dedicated verify confirmation macro 9.

When the live view processing is performed, the processing C unit 363 reads the image data A 43 from the SDRAM 4, performs the processing C thereon, and stores the generated image data C 45 in the SDRAM 4.

In this regards, the image data C 45 generated at the current power supply voltage corresponds to the second image data 46 and is subjected to the verify operation (in step ST2) with respect to the image data C (the first image data 47) generated at the power supply voltage immediately before, which are similar to each of the above-described operation modes. The verify operation is performed by the verify confirmation macro 9 as described above.

As described above, the present embodiment may perform the ASV which is most suitable for a state (operation mode) in which the semiconductor integrated circuit (the image chip 1) is actually operated. In other words, the present embodiment may control each individual LSI to be the respective optimum voltage and further reduce the power consumption.

Further, the present embodiment does not need installation cf, for example, an additional component such as a temperature sensor and thus may be easily applied (used) without increasing cost and an occupancy area.

In the application of the present embodiment, for example, a verify scenario is prepared, and when operation as a product is not performed (when the power is turned off, or the mode is switched), data (log) for the ASV may be collected by running the verify scenario.

Data for the ASV to be collected may be, for example, a result (log) of OK/NG of the verify operation at each voltage as described with reference to FIG. 3B, and the log is accumulated in the memory (for example, a nonvolatile memory) to execute the optimum ASV as a set (system). In other words, the power supply voltage may be controlled by analyzing the log accumulated in the memory.

For example, when comparing the power supply voltage control circuit device 100 described with reference to FIG. 1, in the power supply voltage control circuit device 100 in FIG. 1, the semiconductor integrated circuit 101 is provided with the process monitor 112, and the power supply voltage Vdd is set based on only an output (monitor value) of the process monitor 112.

In contrast, according to the present embodiment, the power supply voltage Vdd may be set according to actual usage conditions (a mounting state, an external environment, an operation mode, and the like) of each semiconductor integrated circuit (image processing chip 1), so that further reduction of the power consumption may be expected by using a lower power supply voltage Vdd.

FIG. 10 is a block diagram illustrating a power supply voltage control circuit device according to a first embodiment and an example of a digital camera system to which the power supply voltage control circuit device of the first embodiment is applied. The digital camera system illustrated in FIG. 10 includes a lens 71, the image sensor 7, the image processing chip 1, the power supply control IC (power supply control circuit, PMIC) 2, the SDRAM 4, the control microcomputer 51, the flash memory (nonvolatile memory) 52, the LCD (monitor) 6, and a secure digital (SD) card 53.

The image sensor 7 which is, for example, a Complementary Metal-Oxide-Semiconductor (CMOS) image sensor converts an optical image formed by the lens 71 into an electrical signal and outputs the electrical signal to the image processing chip 1.

The SD card 53 is a portable large storage capacity nonvolatile memory card which stores a still image and a moving image processed by the image processing chip 1 and, for example, enables the image to be printed by a photo shop and a color printer or to be displayed on a television and a display.

The LCD 6 is a monitor for reproducing a still image and a moving image when the still image and the moving image are captured, reproducing the still image and the moving image captured and stored in the SD card 53, or displaying various information pieces such as settings of photographing conditions.

The power supply voltage control circuit device of the first embodiment includes, for example, the image processing chip (image processing circuit, semiconductor integrated circuit) 1, the power supply control IC 2, the SDRAM 4, the control microcomputer (arithmetic processing circuit) 51, and the flash memory 52. The configurations and processing of the image processing chip 1 and the SDRAM 4 are as described with reference to FIG. 5 to FIG. 9.

The control microcomputer 51 which is provided outside the image processing chip 1 includes, for example, a memory for storing the log 8 described with reference to FIGS. 3A and 3B and executes the above-described verify operation (verify program) using the log 8.

The power supply voltage control circuit device of the first embodiment executes the verify processing (verify program) by the control microcomputer 51 provided outside the image processing chip 1 and performs control to be an optimum power supply voltage Vdd via the power supply control IC 2.

In other words, the control microcomputer 51, for example, acquires the log 8 by performing the verify processing of the first image data and the second image data according to each operation mode of the image processing chip 1 described with reference to FIG. 6 to FIG. 9 and sets the optimum power supply voltage based on the log 8.

As described above, the present embodiment includes the hardware configuration which is not affected by variation in power supply voltage by, for example, accumulating the log 8 of the verify operation in the control microcomputer 51 (built-in memory) independent of the image processing chip 1 of which the power supply voltage is controlled by the power supply control IC 2.

FIG. 11 is a block diagram illustrating a power supply voltage control circuit device according to a second embodiment and an example of a digital camera system to which the power supply voltage control circuit device of the second embodiment is applied.

As it is apparent from comparison between FIG. 10 and above-described FIG. 11, the digital camera system of the second embodiment is configured to store the log 8 in the flash memory 52 and execute the verify program by the CPU 12 in the image processing chip 1. Since other configurations are similar to the digital camera system to which the power supply voltage control circuit device of the first embodiment is applied, the description thereof is omitted.

The power supply voltage control circuit device of the second embodiment includes, for example, the image processing chip (image processing circuit) 1 including the CPU 12, the power supply control IC (power supply control circuit) 2, the SDRAM 4, and the flash memory 52 in which the log 8 is stored. The CPU 12 is provided within the image processing chip 1 and performs the above described verify program using, for example, the log 8 stored in the flash memory 52.

The power supply voltage control circuit device of the second embodiment executes the verify program by the CPU 12 provided within the image processing chip 1 and performs control to be the optimum power supply voltage Vdd via the power supply control IC 2.

In other words, the CPU 12, for example, acquires the log 8 by performing the verify processing of the first image data and the second image data according to each operation mode of the image processing chip 1 described with reference to FIG. 6 to FIG. 9 and sets the optimum power supply voltage based on the log 8.

In order to acquire a result of the verify operation by the CPU 12 built in the image processing chip 1 as a log and to accumulate the log in a memory (nonvolatile memory), various methods may be applied as described, for example, regarding FIG. 4.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A power supply voltage control circuit device comprising:
   a power supply control circuit configured to control a power supply voltage to be applied to a target circuit including an image processing chip;
   a memory configured to store first image data when the target circuit is operated by setting the power supply voltage to a first voltage and second image data when the target circuit is operated by setting the power supply voltage to a second voltage different from the first voltage; and
   an arithmetic processing circuit configured to verify that the first image data coincides with the second image data and output a result of the verification for each image data to the power supply control circuit, wherein
      the memory is further configured to accumulate more than two results of the verify as logs, and
      the power supply control circuit is further configured to control the power supply voltage based on the accumulated logs.

2. The power supply voltage control circuit device as claimed in claim 1, wherein
   the second voltage is lower than the first voltage, and
   the arithmetic processing circuit,
      when the first image data coincides with the second image data, sets the power supply voltage output from the power supply control circuit to a voltage further lower than the second voltage and performs further verification by acquiring new first image data and new second image data, and
      when the first image data does not coincide with the second image data, controls the power supply voltage output from the power supply control circuit to be the first voltage.

3. The power supply voltage control circuit device as claimed in claim 1, wherein
   the target circuit includes a plurality of operation modes, and
   the power supply control circuit controls the power supply voltage with respect to each of the plurality of operation modes.

4. The power supply voltage control circuit device as claimed in claim 1, wherein
   the power supply voltage output from the power supply control circuit is set sequentially to a lower voltage by a predetermined step from a guarantee voltage at which an operation of the target circuit is guaranteed.

5. The power supply voltage control circuit device as claimed in claim 1, wherein
   the operating of the target circuit by setting the power supply voltage to the first voltage is an operation immediately before operating the target circuit by setting the power supply voltage to the second voltage.

6. A power supply voltage control method for controlling a power supply voltage to be applied to a target circuit including an image processing chip, the power supply voltage control method comprising:
   operating the target circuit by setting the power supply voltage to a first voltage to acquire first image data;
   operating the target circuit by setting the power supply voltage to a second voltage different from the first voltage to acquire second image data;
   verifying that the first image data coincides with the second image data;
   accumulating more than two results of the verification as logs; and controlling the power supply voltage based on the accumulated logs.

7. The power supply voltage control method as claimed in claim 6, wherein
the second voltage is lower than the first voltage, and
the power supply voltage control method further comprises:
setting the power supply voltage to a voltage further lower than the second voltage when the first image data coincides with the second image data, and performing further verification by acquiring new first image data and new second image data; and
controlling the power supply voltage to the first voltage when the first image data does not coincide with the second image data.

8. The power supply voltage control method as claimed in claim 6, wherein
the target circuit includes a plurality of operation modes and controls the power supply voltage with respect to each of the plurality of operation modes.

9. The power supply voltage control method as claimed in claim 6, wherein
the power supply voltage is set sequentially to a lower voltage by a predetermined step from a guarantee voltage at which an operation of the target circuit is guaranteed.

10. The power supply voltage control method as claimed in claim 6, wherein
the operating of the target circuit by setting the power supply voltage to the first voltage is an operation immediately before operating the target circuit by setting the power supply voltage to the second voltage.

11. The power supply voltage control method as claimed in claim 6, wherein
the verifying by the first image data and the second image data includes:
storing the first image data and the second image data as a log in a memory before power supply of the target circuit is shut down by a stop control signal for stopping the power supply voltage to the target circuit.

12. A non-transitory computer-readable storage medium storing a power supply voltage control program for controlling a power supply voltage to be applied to a target circuit including an image processing chip, wherein the power supply voltage control program causing an arithmetic processing circuit to execute:
operating the target circuit by setting the power supply voltage to a first voltage to acquire first image data;
operating the target circuit by setting the power supply voltage to a second voltage different from the first voltage to acquire second image data;
verifying by the first image data coincides with the second image data;
accumulating more than two results of the verification as logs; and
controlling the power supply voltage based on the accumulated logs.

* * * * *